United States Patent
Parker

(10) Patent No.: US 9,902,559 B2
(45) Date of Patent: Feb. 27, 2018

(54) SCALE BASED LOAD LIMITING MECHANISM FOR REFUSE VEHICLES WITH AN INTERMEDIATE CONTAINER

(71) Applicant: The Curotto-Can, LLC, Chattanooga, TN (US)

(72) Inventor: Brian T. Parker, Signal Mountain, TN (US)

(73) Assignee: The Curotto-Can, LLC, Chattanooga, TN (US)

( * ) Notice: Subject to any disclaimer, the term of this patent is extended or adjusted under 35 U.S.C. 154(b) by 72 days.

(21) Appl. No.: 14/615,758

(22) Filed: Feb. 6, 2015

(65) Prior Publication Data

US 2015/0232270 A1   Aug. 20, 2015

Related U.S. Application Data

(60) Provisional application No. 61/940,625, filed on Feb. 17, 2014.

(51) Int. Cl.
| | |
|---|---|
| *B65F 3/02* | (2006.01) |
| *B65F 3/04* | (2006.01) |
| *B65F 3/00* | (2006.01) |
| *G01G 19/08* | (2006.01) |

(52) U.S. Cl.
CPC .................. *B65F 3/04* (2013.01); *B65F 3/00* (2013.01); *G01G 19/083* (2013.01); *B65F 2003/003* (2013.01); *B65F 2003/022* (2013.01); *B65F 2210/184* (2013.01)

(58) Field of Classification Search
CPC ........ B65F 2003/0279; B65F 2003/023; B65F 3/041

USPC .... 414/345, 422, 406, 421, 408, 500, 525.4, 414/525.5, 525.6; 60/399; 91/449
See application file for complete search history.

(56) References Cited

U.S. PATENT DOCUMENTS

| | | |
|---|---|---|
| 4,042,049 A | 8/1977 | Reichow et al. |
| 4,102,262 A | 7/1978 | Liberman et al. |
| 4,771,837 A | 9/1988 | Appleton et al. |
| 4,839,835 A | 6/1989 | Hagenbuch |
| 4,854,406 A | 8/1989 | Appleton et al. |

(Continued)

FOREIGN PATENT DOCUMENTS

| | | |
|---|---|---|
| GB | 2 448 739 | 10/2008 |
| JP | 07-206104 | 8/1995 |

OTHER PUBLICATIONS

Press Release entitled "Air-Weigh Makes On-Board Scales Smarter Than Ever", Oct. 23, 2007, 2 pages.

(Continued)

*Primary Examiner* — Gregory W Adams
(74) *Attorney, Agent, or Firm* — Harness, Dickey & Pierce, P.L.C.

(57) ABSTRACT

A weight based load limiting system for a refuse vehicle. The system includes a weight determination module that generates a signal that varies in accordance with a vehicle weight. If the vehicle weight approaches or exceeds a predetermined maximum weight, the signal inhibits a portion of the loading or packing operation to prevent overloading the vehicle. In various configurations, the system prevents a lifting of a refuse container to prevent emptying of the container into the vehicle hopper. In other various configurations, the system prevents gripping of a refuse can.

5 Claims, 4 Drawing Sheets

(56) References Cited

U.S. PATENT DOCUMENTS

| | | | |
|---|---|---|---|
| 4,919,222 A * | 4/1990 | Kyrtsos | G01G 5/04 177/139 |
| 5,004,392 A | 4/1991 | Naab | |
| 5,065,829 A | 11/1991 | Smith | |
| 5,209,312 A | 5/1993 | Jensen | |
| 5,230,393 A | 7/1993 | Mezey | |
| 5,304,744 A | 4/1994 | Jensen | |
| 5,577,876 A * | 11/1996 | Haeder | B60K 28/04 180/273 |
| 5,644,489 A | 7/1997 | Hagenbuch | |
| 5,822,224 A | 10/1998 | Nakanishi et al. | |
| 5,837,945 A * | 11/1998 | Cornwell | B65F 3/04 177/136 |
| 5,844,474 A | 12/1998 | Saling et al. | |
| 5,995,888 A | 11/1999 | Hagenbuch | |
| 6,030,169 A * | 2/2000 | Rossow | B60K 28/04 180/273 |
| 6,123,497 A | 9/2000 | Duell et al. | |
| 6,325,587 B1 * | 12/2001 | Wysocki | B65F 1/004 220/909 |
| 6,332,745 B1 | 12/2001 | Duell et al. | |
| 6,422,800 B1 | 7/2002 | Reichow et al. | |
| 6,526,747 B2 * | 3/2003 | Nakatani | E02F 9/22 60/399 |
| 6,601,013 B2 | 7/2003 | Lueschow et al. | |
| 6,703,569 B2 | 3/2004 | Moore et al. | |
| 6,858,809 B2 | 2/2005 | Bender | |
| 7,276,669 B2 | 10/2007 | Dahl et al. | |
| 7,330,128 B1 | 2/2008 | Lombardo et al. | |
| 7,370,904 B2 | 5/2008 | Wood, Jr. et al. | |
| 7,495,185 B2 | 2/2009 | Takeda et al. | |
| 7,562,616 B2 * | 7/2009 | Stolten | B66F 9/22 251/264 |
| 7,831,352 B2 | 11/2010 | Laumer et al. | |
| 8,496,427 B2 | 7/2013 | Curotto et al. | |
| 8,764,371 B2 | 7/2014 | Whitfield, Jr. et al. | |
| 2004/0084226 A1 | 5/2004 | Wright | |
| 2006/0045700 A1 | 3/2006 | Siebers et al. | |
| 2007/0273493 A1 | 11/2007 | Reichow et al. | |
| 2008/0109131 A1 | 5/2008 | Pillar et al. | |
| 2008/0166215 A1 * | 7/2008 | Haynes | B65G 57/165 414/788.2 |
| 2010/0119341 A1 * | 5/2010 | Flood | B65F 1/1484 414/406 |
| 2010/0206642 A1 | 8/2010 | Curotto | |
| 2010/0322749 A1 * | 12/2010 | Rowland | B65F 3/041 414/408 |
| 2011/0116899 A1 | 5/2011 | Dickens | |
| 2012/0027548 A1 * | 2/2012 | Whitfield, Jr. | B65F 3/00 414/408 |
| 2012/0087773 A1 * | 4/2012 | Curotto | B65F 1/122 414/810 |
| 2012/0273498 A1 * | 11/2012 | Curotto | B65F 1/06 220/495.06 |
| 2014/0010630 A1 | 1/2014 | Curotto | |
| 2014/0060939 A1 * | 3/2014 | Eppert | E02F 3/342 177/1 |

OTHER PUBLICATIONS

Press Release entitled "Air-Weigh Makes Scales for Refuse Trucks", May 6, 2008, 1 page.

PowerPoint Presentation entitled "LoadMaxx", undated, 7 pages.

* cited by examiner

SCALE BASED LOAD LIMITING MECHANISM FOR REFUSE VEHICLES WITH AN INTERMEDIATE CONTAINER

CROSS-REFERENCE TO RELATED APPLICATIONS

This application claims the benefit of U.S. Provisional Application No. 61/940,625, filed on Feb. 17, 2014. The entire disclosure of the above application is incorporated herein by reference.

FIELD

The present disclosure relates to refuse vehicles and a load limiting mechanism for the same.

BACKGROUND

This section provides background information related to the present disclosure which is not necessarily prior art.

Refuse vehicles play a key role in dispensing of refuse by traversing an area, stopping at a location where the user, resident, commercial business, or the like has deposited refuse for collection, depositing the refuse in the refuse vehicle, and transporting the refuse to a processing center, such as a recycling center, landfill, or incineration center. With a continuing need to reduce energy and emissions, there has been a trend towards designing and building lighter refuse vehicles. Lighter refuse vehicles are typically more limited in the payload that they can carry, but are more fuel efficient. This trend towards designing and building more economically operated vehicles has resulted in refuse vehicles having lighter components, and, consequently, lighter payload capacities. It is thus easier to overload contemporary refuse vehicles than their traditional counterparts.

In typical refuse collection operations, it is often difficult to estimate the weight of the refuse collected because of the many variables that determine the weight of the refuse. For example, the nature of the refuse itself can vary from collection to collection. Some refuse may be more dense resulting in more weight for a given volume when such refuse is added to the vehicle. Other refuse might be less dense resulting in less weight for a given volume when such refuse is added to the vehicle. Environmental conditions can cause the weight of a particular load to vary significantly. For example, if a load of refuse includes material which may absorb liquid, the weight of that load will vary depending on whether it is collected on a rainy or a dry day. Thus, vehicle operators cannot determine with certainty that a predetermined number of collections will result in maximizing the payload of the vehicle, without overloading the vehicle, prior to returning to the processing center to dump the collected refuse. It is generally desirable to not return to the processing center before the vehicle payload has been maximized. Because of this variability in load-to-load and to overall payload weights, vehicle operators presently have limited knowledge of the payload of the vehicle.

Further, operators are sometimes prone to push the limits of payload capacity. While pushing the payload capacity may have had less impact when utilizing traditional refuse vehicles, newer, more efficiently designed refuse vehicles are less tolerant of overload conditions and could damage the vehicle. Present refuse vehicles have no way of limiting further intake of refuse based upon weight. While in certain instances, the volume of the container portion of the refuse vehicle imposes limits, when moving particularly dense materials, it may be necessary to return to the processing center prior to the container becoming full.

SUMMARY

This section provides a general summary of the disclosure, and is not a comprehensive disclosure of its full scope or all of its features.

A refuse vehicle including a hopper supported by the refuse vehicle. A lift mechanism for attaching to a container containing refuse to be added to the hopper via a lift operation. A gripper for dumping refuse into the container. A sensor senses a weight that varies in accordance with the refuse contained in the hopper. A controller receives a weight signal from the sensor. A lift lockout inhibits operation of the lift mechanism if the weight sensed by the sensor exceeds a predetermined value.

A refuse vehicle includes a hopper supported by the refuse vehicle. A gripper mechanism takes hold of a refuse can to be added to the container on the lift mechanism. A sensor for senses a weight that in accordance with the refuse contained in the hopper. A controller receives a weight signal from the sensor. A lockout inhibits operation of the gripper mechanism if the weight sensed by the sensor exceeds a predetermined value.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
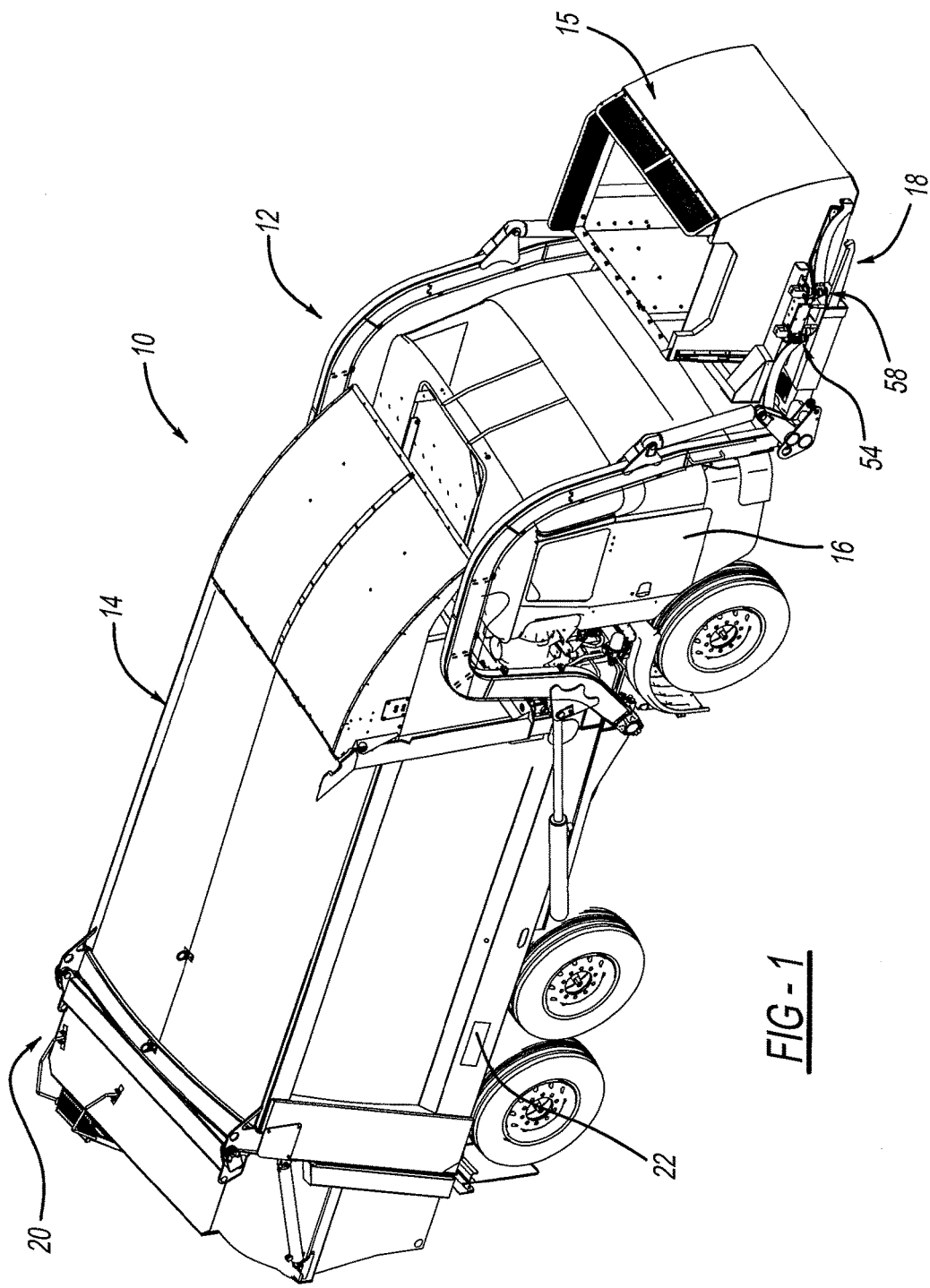
FIG. 1 is a side view of a front loading refuse vehicle having a load limiting system.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 depicts a side view of a front loading refuse vehicle 10 arranged in accordance with various embodiments. Vehicle 10 is arranged as a front loading refuse vehicle and includes a front loading lift arm assembly 12 which connects to a front portion of a container or bin 14 and extends from behind the operator cab 16 to in front of the operator cab 16. Front loading lift arm assembly 12 includes a fork mechanism 18 deployed to a generally horizontal position to engage a refuse container 15. The refuse container 15 is generally known in the field as a Curotto Can. The refuse container 15 includes a lift assembly 54 that grabs refuse cans and dumps them in the container 15. Once fork mechanism 18 has engaged the container 15, lift arm assembly 12 is pivoted upwardly and rearwardly to invert the container and dispose the contents into vehicle container 14 via a hopper. Refuse vehicle 10 may also include a compaction mechanism 20 which compacts refuse within container 14 to allow more refuse to be disposed therein. As will be described in greater detail and shown schematically in FIG. 1, refuse vehicle 10 includes a load limiting system 22 that limits operation of lift arm assembly 12 upon detection that vehicle 10 is near or exceeds its maximum payload, or other predetermined, condition.

Figure 2:
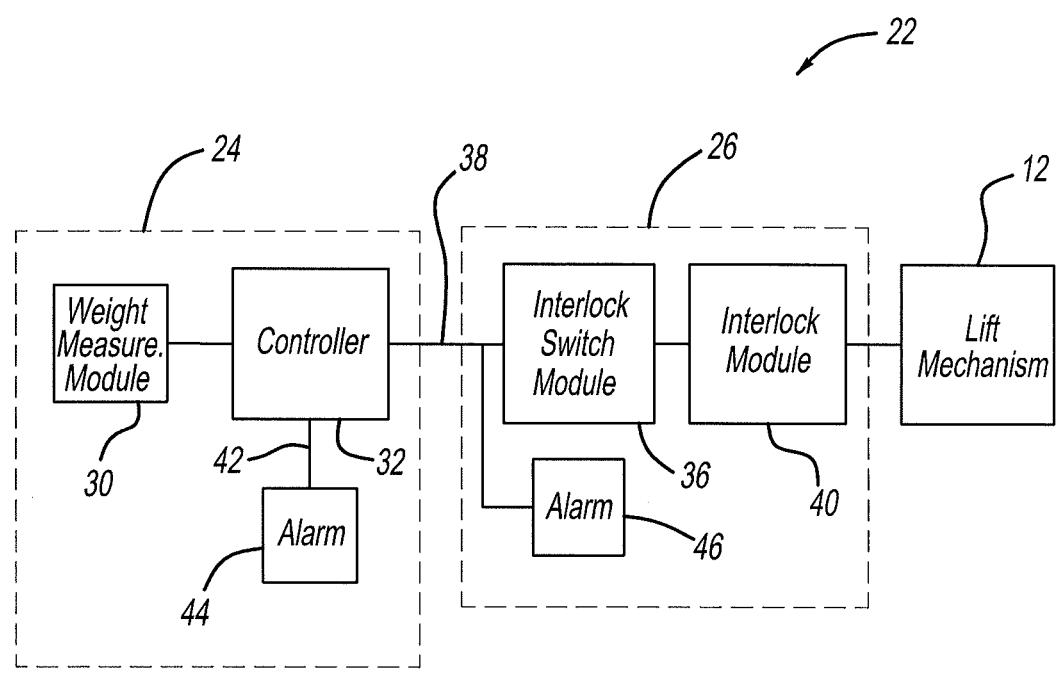
FIG. 2 is a block diagram of a load limiting system for a front loading refuse vehicle according to various embodiments.

FIG. 2 is a block diagram of the load limiting system 22 of FIG. 1. Load limiting system 22 includes a weight determination system 24, a lift control system 26, and a lift mechanism 12. Weight determination system 24 includes a weight measuring module 30, such as a weight sensor, scale, or other weight measuring device. Weight measuring module 30 sends a signal to controller 32 of weight determination system 24. Controller 32 determines whether a maximum payload weight is being approached or exceeded, as defined in accordance with various design specifications, and generates a signal 38 output by weight determination system 24 to interlock switch module 36 of lift control system 26. The signal 38 output by controller 32 to interlock switch module 36 may be a signal indicating an actual or near-overload condition, which can occur before or during a lift operation. Interlock switch module 36 inhibits operation of lift mechanism 12 via interlock module 40. In various embodiments signal 38 is an activation signal for interlock switch module 36. In other embodiments, signal 38 may be a signal indicating a predetermined condition that may be further processed by interlock switch module 36 prior to determining whether to activate interlock module 40. In various embodiments, interlock switch module 36 may include a relay or other switch that generates an inhibit signal to interlock module 40. Interlock module 40 may include an interlock solenoid or other device, such as an electrical, mechanical, pneumatic device or combination thereof, that inhibits operation of lift mechanism 28.

In various embodiments, interlock module 40 includes an interlock solenoid. The interlock solenoid may operate with lift arm assembly 12 of refuse vehicle 10 of FIG. 1 to prevent lift arm assembly 12 from being raised a predetermined height. In various embodiments, interlock module 40 may include an interlock relay. In various embodiments, the interlock relay can inhibit upward motion of lift arm assembly 12 beyond a predetermined travel position if the door to container 14 is not open to receive refuse. The interlock module 40 can also be used to limit the upward motion of the lift arm assembly 12 if the present vehicle weight of the vehicle and weight of the container 15 being lifted causes a predetermined vehicle weight parameter, such as the gross vehicle weight to be exceeded. This allows the operator to set the container back on the ground while preventing the operator from loading the refuse vehicle 10 beyond the predetermined gross vehicle weight limit.

In various embodiments, controller 32 generates a second signal 42 to an alarm 44, such as an audible and/or visual alarm. Signal 42 can operate an alarm 44 in response to a near overload or actual overload condition, so that the operator can be advised to avoid attempting to add further payload to refuse vehicle 10. In various other embodiments, alarm signal 42 may indicate that a predetermined percentage of gross vehicle weight has been exceeded so that the operator can plan additional stops prior to nearing the gross vehicle weight capacity.

In various embodiments, lift control system 26 includes an alarm 46 that receives signal 38 from controller 32. Alarm 46 may be an audible or visual alarm and may indicate an overload condition. Alarm 46 may work independently of or in conjunction with alarm 44 to provide the same or additional information to the vehicle operator about the present state of the loading of the vehicle 10.

Weight determination system 24, according to various embodiments, can determine a running tare weight for an empty container, a gross vehicle weight (which is typically the tare weight and the payload weight), or individual axle weights. Of particular relevance is that the weight or weights monitored are monitored to prevent the payload carried by the refuse vehicle 10 from exceeding a predetermined payload.

Figure 3:
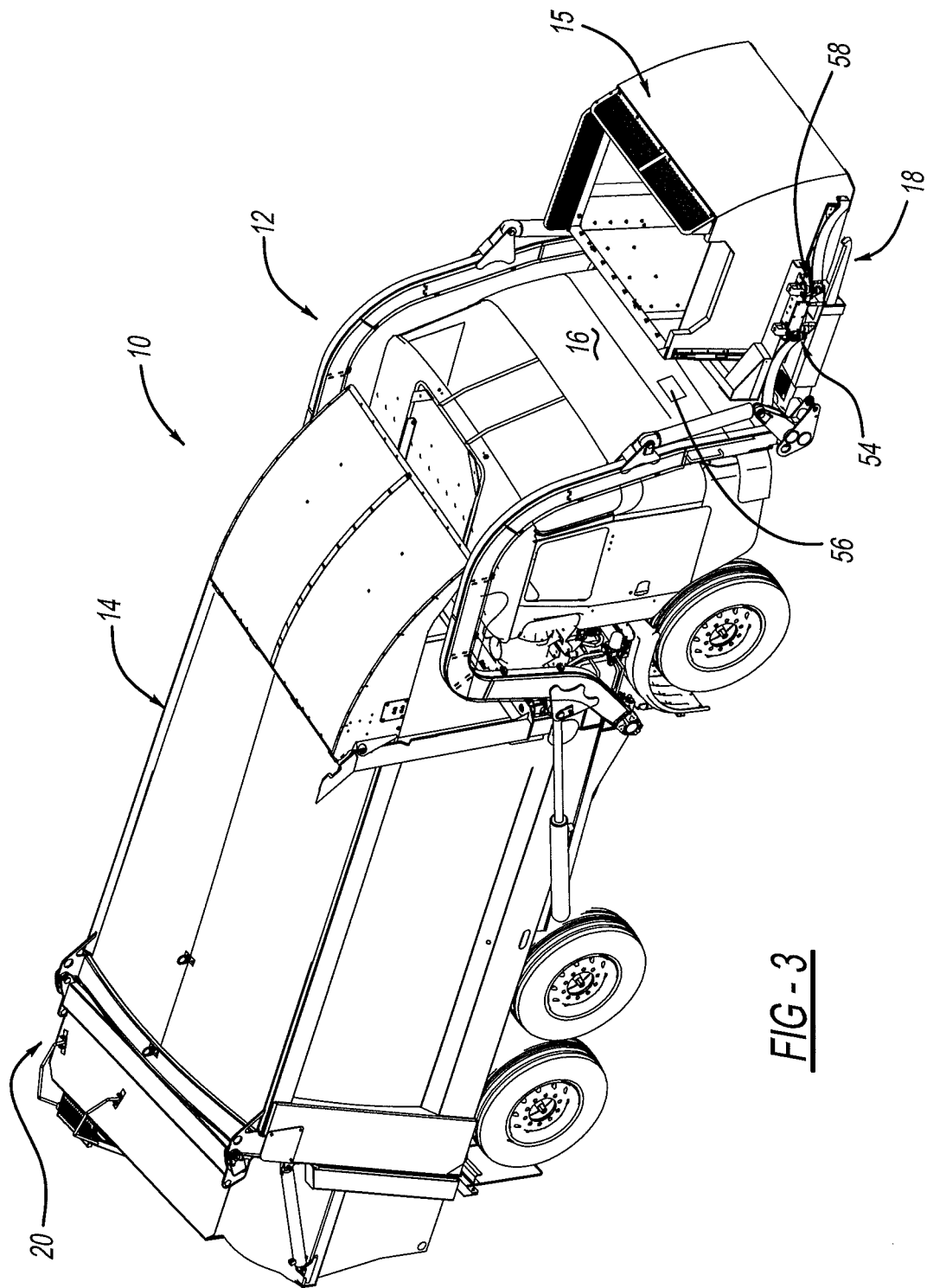
FIG. 3 is a side view of a front loading refuse vehicle having a load limiting system.

The lift assembly 54 is configured to engage a refuse can, lift the refuse can, and deposit refuse from the can into container 15. The lift assembly 54 raises the refuse can and inverts the can to empty the refuse from the can into container 15. The lift assembly 54 includes a gripper 58 that typically encircles the refuse can and then lifts the can upward to empty its contents into the container 15. Load limiting system 56 is shown in schematic form in FIG. 3. Various embodiments of load limiting system 56 can be described in connection with FIGS. 4 and 5.

Figure 4:
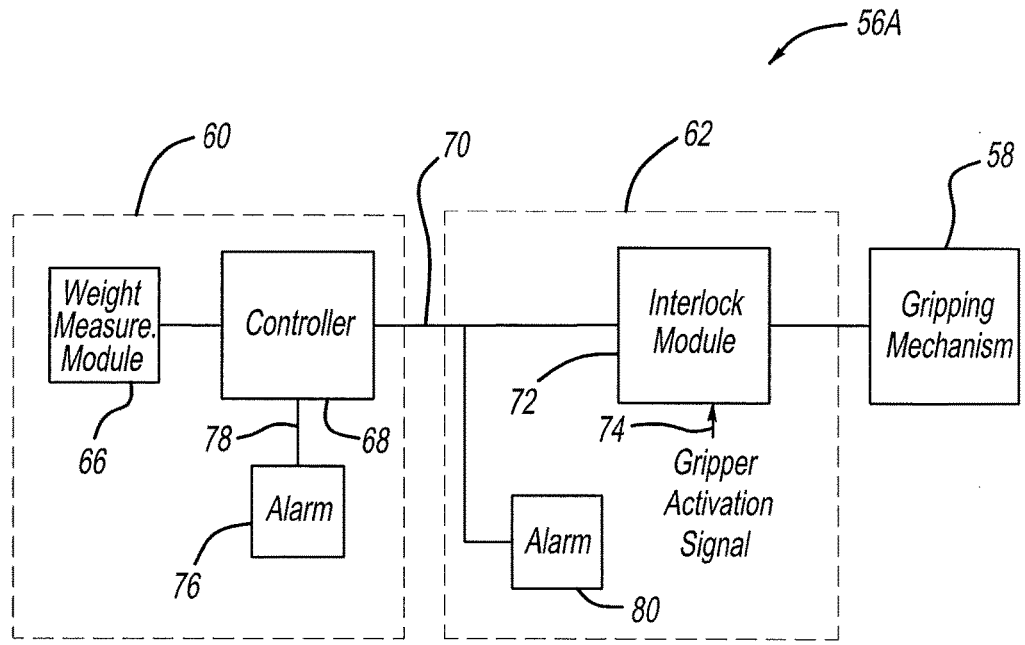
FIG. 4 is a block diagram of a load limiting system for a front loading refuse vehicle according to various embodiments.

FIG. 4 depicts a load limiting system 56A arranged according to various embodiments. FIG. 4 operates similarly to FIG. 2 but affects the limiting operation by preventing activation of the gripper portion 58 of lift mechanism 54, thereby preventing the gripping, lifting, and emptying of a refuse can process. Load limiting system 56A of FIG. 4 includes a weight determination system 60, a lift control system 62, and a gripping mechanism 58.

Weight determination system 60 operates similarly as described above with respect to FIG. 2. In particular, weight determination system 60 includes a weight measuring module 66 which generates a signal to controller 68. Controller 68 generates a signal 70 output to interlock module 72 of lift control system 62. Interlock module 72 also receives a gripper activation signal 74. Gripper activation signal 74 may be electrical, mechanical, hydraulic, or a combination thereof. Interlock module 72 receives the signal 70 from controller 68 and gripper activation signal 74 and determines whether activation of the gripper mechanism 58 is appropriate. According to various embodiments, if signal 70 indicates a weight near or above the maximum weight, interlock module 72 can inhibit activation of gripper mechanism 58. This prevents gripping mechanism 58 from gripping the refuse can in order to pick it up and empty its contents into the container 15. If the operator cannot cause the gripping mechanism 58 to grip the container to be emptied, additional payload cannot be added to the vehicle. Weight determination system 60 also includes an alarm 76 which may be a visual display or audible alarm. Alarm 76 receives an alarm signal from controller 68 that causes activation of alarm 76. A second alarm 80 may be activated by signal 70, that also activates interlock module 72, to indicate that the interlock function has been activated. Alarms 76 and 80 may operate as described above with respect to FIG. 2.

Figure 5:
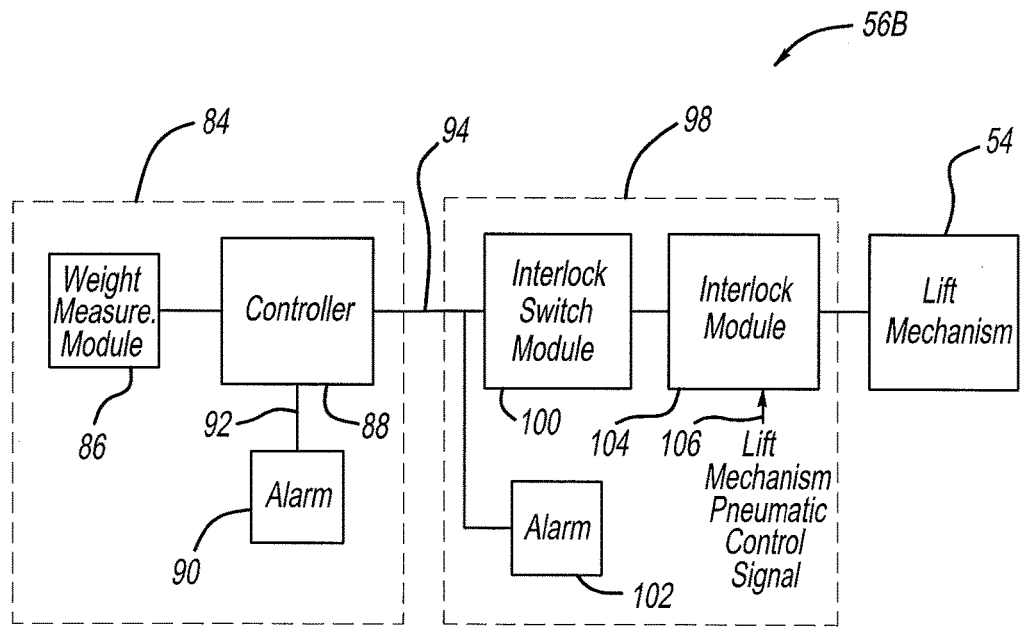
FIG. 5 is a block diagram of a load limiting system for a front loading refuse vehicle according to various embodiments.

With reference to FIG. 5, FIG. 5 depicts a block diagram for a load limiting system 56B in accordance with various embodiments. Load limiting system 56B operate similarly to portions load limiting system 22 of FIG. 2 and load limiting system 56A of FIG. 1. According to various embodiments of load limiting system 56B, lift mechanism 54 of FIG. 1 is operated pneumatically so that inhibiting a lift operation of lift mechanism 54 through pneumatic controls. Load limiting system 56B includes a weight determination system 84 having a weight measuring module 86, a controller 88, an alarm 90 that receives an alarm signal 92. Weight determination system 84 operates similarly as described above with respect to weight determination system 24 of FIG. 2 and weight determination 60 of FIG. 4. Controller 88 generates a signal 94 to lift control system 98. Signal 94 is applied to interlock switch module 100. Interlock switch module 100 generates a signal to interlock module 104. Interlock module 104 also receives a lift mechanism pneumatic control signal 106. Lift mechanism pneumatic control signal 106 is generated by the operator to direct lifting of lift mechanism 54. Signal 94 is also input to alarm 102 which can indicate that the vehicle weight is approaching maximum payload or has exceeded maximum payload, or to indicate that an inhibit condition exists to prevent operation of lift mechanism due to the vehicle weight.

When payload conditions do not indicate inhibiting operation of lift mechanism 54, lift mechanism pneumatic control signal 106 is passed through interlock module 104 to cause a lift operation of lift mechanism 54. When the vehicle weight approaches or exceeds a maximum vehicle weight, as determined by various design considerations, interlock module 104 inhibits lift mechanism pneumatic control signal 106 from operating lift mechanism 54. This inhibits a lifting operation so that the lift mechanism 54 cannot raise the can in order to empty the contents of the can into the hopper 15 on the forks 18.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A refuse vehicle comprising:
a bin supported on the refuse vehicle;
a first lift mechanism, a container is coupled with the first lift mechanism, the container receives refuse that is to be added to the bin via a lift operation;
a second lift mechanism, the second lift mechanism associated with the container, the second lift mechanism adding refuse into the container, the container is coupled with the first lift mechanism on the vehicle, the second lift mechanism includes a gripper, the gripper takes hold of a can containing refuse to be added to the container coupled with the first lift mechanism;
a sensor for sensing a payload weight of the refuse vehicle, the weight varying in accordance with the refuse contained in the bin;
a controller, the controller receiving a payload weight signal from the sensor;

an interlock, the interlock inhibiting operation of the second lift mechanism on the container if the payload weight sensed by the sensor exceed a predetermined value.

2. The refuse vehicle of claim 1, wherein the second lift mechanism lifts the can toward the container to deposit refuse in the container.

3. The refuse vehicle of claim 1, wherein the interlock inhibits the gripper from taking hold of the can.

4. The refuse vehicle of claim 1, wherein the second lift mechanism is mounted on the container.

5. The refuse vehicle of claim 1, wherein the interlock inhibits raising of the second lift mechanism.

\* \* \* \* \*